3,704,105
PROCESS FOR PREPARING OVERBASED BARIUM SULFONATES AND THEIR USE IN DIESEL FUELS
Warren L. Perilstein, Orchard Lake, Mich., assignor to Ethyl Corporation, New York, N.Y.
No Drawing. Filed Sept. 16, 1968, Ser. No. 762,371
Int. Cl. C10l 1/32
U.S. Cl. 44—51                            9 Claims

ABSTRACT OF THE DISCLOSURE

A process for preparing overbased barium olefin derived sulfonates is described. Their use as smoke reducing additives in distillate fuels is also disclosed.

BACKGROUND OF INVENTION

This invention is directed to a method of preparing overbased barium sulfonates and their use in distillate fuels.

Processes for preparing overbased alkaline earth oil soluble sulfonates are available in the art (see e.g. U.S. 2,617,049, U.S. 2,956,018, U.S. 3,027,325, and U.S. 3,312,618). The principal products disclosed in the art appear to be those prepared from petroleum derived sulfonic acids. These petroleum derived sulfonic acids are in general alkaryl sulfonates obtained as side products from the sulfuric acid treatment of petroleum hydrocarbons in refining operations.

The term "overbased" indicates that the resultant product from these various processes contains an amount of alkaline earth metal greater than the stoichiometric amount of metal which would be present if the particular sulfonic acid were fully neutralized. The theory of this overbased complex formation is not fully understood. One suggestion has been that the oil soluble sulfonates act as protective colloids or dispersants thus keeping an alkaline earth compound suspended in a fluid carrier.

A general method of preparing these complexes features the in situ formation of a finely divided alkaline earth compound such as $CaCO_3$, in the presence of a petroleum sulfonate in a hydrocarbon medium. This is accomplished by introducing an acidic gas such as carbon dioxide into an alkaline earth containing, petroleum sulfonate dispersion in a hydrocarbon medium. Recent improvements in this process feature the use of promoters such as low molecular weight alcohols, phenols, amines, and the like.

The present invention provides a method of preparing overbased barium complexes utilizing sulfonated olefin derivatives. The products are effective smoke suppressors in distillate fuels; sulfur dioxide blown complexes offer improved resistance to emulsification.

SUMMARY OF THE INVENTION

A process for preparing overbased barium complexes from a sulfonated olefin derivative, an inorganic barium compound, and an acidic gas in the presence of a $C_1$–$C_5$ alkanol and water in a hydrocarbon medium; the product obtained by this process and its use as a smoke reducing distillate fuel additive are described.

DESCRIPTION OF THE PREFERRED EMBODIMENTS

One embodiment of this invention is a process for preparing an overbased barium olefin derived sulfonate which comprises:

(1) Preparing a mixture of a sulfonated olefin derivative wherein said derivative is obtained by sulfonating a mixture of acyclic monoolefins having from about 14 to about 30 carbon atoms, and an inert hydrocarbon medium (2) Adding thereto a mixture of from about 2 to about 10 times the stoichiometric amount based on said derivative, of an inorganic barium compound selected from barium oxide, barium hydroxide and barium hydroxide monohydrate, and from about 500 to about 1500 parts by weight of a $C_1$–$C_5$ alkanol, per mole of said barium compound and a small amount of water, heating the resultant mixture to a temperature of from about 35° C. to about 150° C., (3) Introducing into said heated mixture a gas selected from sulfur dioxide and carbon dioxide until said mixture becomes acidic, and (4) Distilling the alkanol and water from said mixture.

It is preferred that the sulfonated olefin derivative is prepared by sulfonating a $C_{18}$ olefin mixture whose specific composition is given below. Barium oxide as the barium compound, methanol as the alkanol, $C_6$–$C_8$ aromatic hydrocarbons, an aviation alkylate or a combination of these hydrocarbons with a light petroleum oil as the hydrocarbon medium, are used in a most preferred embodiment of the process.

Another embodiment of this invention is the product prepared by the process of this invention. A further embodiment of this invention is a distillate fuel containing a smoke reducing product. A diesel fuel composition containing said product is a preferred embodiment.

The process of the present invention comprises reacting in a hydrocarbon medium, a sulfonated olefin derivative, a stoichiometric excess based on said derivative of an inorganic barium compound mixed in a $C_1$–$C_5$ alkanol and a small amount of water, heating said mixture to a temperature of from about 35° C. to about 150° C. and introducing a stream of sulfur dioxide or carbon dioxide into said heated mixture until said mixture becomes acidic.

The sulfonated olefin derivative is a product obtained on sulfonating acyclic monoolefins having from 14 to about 30 carbon atoms. Methods of sulfonating olefins are available in the art and any suitable process can be used. Suitable procedures are described in the following patents, U.S. 3,259,645, U.S. 3,337,437, British 1,072,601, French 1,399,570, and French 1,403,447. In general, the sulfonation process involves the reacting of an olefin with sulfur trioxide. Especially suitable processes for sulfonating olefins and the mechanisms involved are described in the journal, "Hydrocarbon Processing," vol. 7, No. 3, pp. 109–114, March (1968). These processes are also applicable to mixtures containing olefins other than α-olefins.

The olefins which are sulfonated for use in the present invention are mixtures of acyclic monoolefins having from about 14 to about 30 carbon atoms. By olefins I mean olefin hydrocarbons. Olefins which are especially useful for sulfonation are synthesized by methods known in the art. For example, they may be prepared by cracking wax paraffins; by catalytically dehydrogenating paraffinic hydrocarbons; or by polymerizing low molecular weight olefins such as ethylene, using Ziegler-type catalysts. It is the general nature of these olefin preparations that mixtures of olefins are obtained. These mixtures contain olefins of various chain length as well as olefinic configuration, that is, α-olefin (vinyl and vinylidene type) and internal olefins. The olefins may be branched or linear. A preferred mixture of olefins contains more than about 60% α-olefins.

The mixtures of useful olefins contain varying ratios and combinations of olefins having from about 14 to about 30 carbon atoms. These mixtures may contain linear olefins, branched olefins, and mixtures thereof.

Representative examples of monoolefin mixtures from which preferred sulfonated olefin derivatives are prepared are presented in the following table; the mixtures contain more than about 60 percent α-olefins.

TABLE 1.—PREFERRED OLEFIN MIXTURES
(Percent by Weight)

| Olefin | A | B | C | D | E | F | G | H |
|---|---|---|---|---|---|---|---|---|
| $C_{12}$ | 0.3 | | | | | | | |
| $C_{14}$ | 26.5 | 0.1 | | | 9 | 1 | 0.1 | |
| $C_{16}$ | 58.0 | 0.1 | 35 | 40 | 3 | 2 | | 0.3 |
| $C_{18}$ | 12.9 | 21.3 | 38 | 35 | 25 | 14 | 20 | 0.5 |
| $C_{20}$ | | 13.9 | 24 | 13 | 42 | 31 | 33 | 55 |
| $C_{22}$ | | 14.1 | | 2 | 11 | 29 | 32 | 19 |
| $C_{24}$ | | 18.7 | | 1 | 9 | 11 | 6 | 15 |
| $C_{26}$ | | 16.1 | | | 6 | 6 | 2 | 8 |
| $C_{28}$ | | 9.4 | | | 2.5 | 3 | 1.5 | 2 |
| $C_{30}$ | | 4.6 | | | 0.5 | 0.9 | 0.5 | 0.1 |
| $C_{32}$ | | 1.7 | | | | | | 0.1 |
| Non-olefins | 2.3 | | 3 | | | 3 | 5 | |

Blends of these mixtures are also useful. A blend of seven volumes of mixture A and eleven volumes of mixture B is a particularly useful blend.

Especially preferred sulfonated olefin derivatives are those prepared from mixtures of monoolefins (identified herein as $C_{18+}$ olefins) having the following composition. In addition to olefins, the mixture may contain up to about 5 percent paraffin.

| Olefin chain length | [1] Percent by weight |
|---|---|
| $C_{16}$ and lower | 0–3 |
| $C_{18}$ | 0.5–20 |
| $C_{20}$ | 33–55 |
| $C_{22}$ | 19–37 |
| $C_{24}$ | 6–15 |
| $C_{26}$ | 2–8 |
| $C_{28+}$ | 0.3–10 |

[1] Vapor phase chromatography analysis.

| Olefin configurations | [2] Percent distribution |
|---|---|
| Vinyl | 32–55 |
| Internal | 10–31 |
| Vinylidene | 30–50 |

[2] Nuclear magnetic resonance analysis.

The product obtained on sulfonating olefins is generally a mixture of compounds. This product will be referred to herein as sulfonated olefin derivative. Alkene sulfonic acids generally constitute a major portion of the sulfonated olefin derivative. They may be represented by the formula

A—SO₃H

I wherein A is the hydrocarbon alkenyl residue of the olefin which is sulfonated. Hydroxyalkyl or alkenyl sulfonic acids may also be present; they may be represented by the formulae

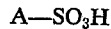

II or

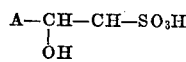

III wherein A has the same meaning as above and R, $R_1$, and $R_2$ are hydrogen alkyl or alkenyl groups so that at least one of R, $R_1$ and $R_2$ is an alkyl or alkenyl group; the nature of these R, $R_1$, $R_2$ groups is dependent on the olefin which is sulfonated. Sultones are also among the products found in this sulfonated olefin derivative. The sultones are cyclic sulfonate esters having the formulae:

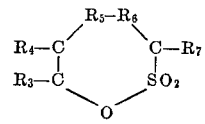

IV

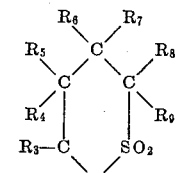

V wherein $R_3$–$R_9$ are alkyl, alkenyl, or hydrogen groups depending on the type of olefin which was sulfonated. The distribution of the alkene sulfonic acids, hydroxyalkenyl or -alkyl sulfonic acids, sultones, and any other products which may be present in the sulfonated olefin derivative may vary depending on the sulfonation procedure used. The article cited above, and incorporated by reference, describes the relationship of the sulfonation process to the sulfonated product mixture obtained. The ratio of these different compounds in the sulfonated olefin derivative used in the present invention is not critical. Whatever the makeup of the sulfonated olefin derivative is, its use in the present process is based on a determination of its total acid value via the saponification number and/or acid number.

The sulfonated olefin derivative is generally used as obtained from the sulfonation process without saponification. In the event that the sulfonated olefin derivative has been saponified, that is, treated with sodium or potassium hydroxide to form a sulfonate salt, this salt may also be used in the process. If the sulfonate salt is used in the present process, it would be better to convert this salt to the corresponding barium salt.

The hydrocarbon medium used in the present process preferably is a solvent for the sulfonated olefin derivative. Another criterion for the hydrocarbon medium is that it is inert in the process of the present invention. It is also preferred that the hydrocarbon medium be a liquid under standard temperature and pressure conditions. Any hydrocarbon meeting these criteria can be used in the present process. Some suitable hydrocarbons are paraffins such as hexane, heptane, isooctane, aviation alkylate, mixtures thereof and the like; aromatic hydrocarbons, such as xylene, benzene, toluene, mixtures thereof and the like; petroleum refinery stream products such as the reformates, alkylates and the like; light hydrocarbon oils such as No. 9 oil, petroleum distillate fuel oils, kerosene, naphtha, and the like, and mixtures of any combination of these materials.

The inorganic barium compounds used in the practice of this invention are generally compounds containing barium and oxygen or barium, oxygen and hydrogen. Suitable compounds are barium oxide, barium hydroxide, and the barium hydroxide hydrates such as barium hydroxide monohydrate and the like. A desirable characteristic of these inorganic compounds is that they are soluble in a low molecular weight alkanol.

The alkanol used in the present invention is one having from one to about 5 carbon atoms. Isopropanol, ethanol, n-butanol, pentanol-3 are examples of suitable alkanols. Methanol is an especially preferred alkanol. The inorganic barium compound is generally dissolved in an alkanol for addition to the reaction mixture in the present process. Thus, sufficient alkanol is used to prepare such a solution.

The ratio of the reactants used in the present process may be varied. It is essential, however, that a greater than stoichiometric amount, based on the sulfonated olefin derivative acid value, of the inorganic barium compound be used in the process. The acid value of the sulfonated olefin derivative is obtained by determining either the saponification number or acid number of the derivative. The saponification number is the number of milligrams of potassium hydroxide required to saponify one gram of olefin derivative; the acid number is the number of milligrams of KOH required to neutralize one gram of the sulfonated olefin derivative. The saponification number in the case of the sulfonated olefin derivative containing only free sulfonic acids is equivalent to the acid number; and thus either determination will account for all sulfonic acid values. The saponification number rather than the acid number is preferably used for the sulfonated olefin derivatives which contain mixtures of sulfonic acids and the inner ester sultones. From this saponification (or acid) number, the combining value or acid value of the sulfonated olefin derivative is calculated.

The stoichiometric amount of barium compound is that amount required to fully neutralize the sulfonated olefin derivative. Since the present process produces an overbased product, that is, one in which more than the stoichiometric amount of barium is present, the amount of inorganic barium compound used must be greater than the stoichiometric amount indicated above. In general, from 2 to 25 times the stoichiometric amount of the inorganic barium compound is used in the present invention; an amount of from 5 to 25 times the stoichiometric amount is preferred.

A small amount of water is also added to the reaction mixture. The exact function of the water in the present system is not fully understood. However, the water is required in carrying out the process in this invention. The amount of water added is based on the weight of sulfonated olefin derivative used. Generally, from about 2 to about 10 percent by weight of water based on the weight of the sulfonated olefin derivative charged is used.

The reaction is usually carried out at elevated temperatures. Reaction temperatures ranging from about 30° C. to the reflux temperature of the reaction mixture is used. The reflux temperature, of course, will be dependent upon the particular hydrocarbon medium used, its amount and the amount of alkanol added to the system. An upper reaction temperature limit for a practical system would be about 150° C. This reaction temperature is the temperature at which the acidic gas, that is, carbon dioxide or sulfur dioxide is passed into the solution to effect production of the overbased complex. As the examples below will illustrate, some steps in the process are carried out at temperatures different from the reaction temperature referred to above. This is particularly true when the preferred sulfonated olefin derivative is used as one of the reactants. As indicated above, the sulfonated olefin derivative can contain a considerable portion of sultone. The sultone in order to be effective in the present process requires hydrolysis to the corresponding sulfonic acid. For this reason, in order to insure that substantially all the sultone is hydrolyzed, a stoichiometric amount of inorganic barium compound and a small amount of water are initially added to the system; free acid is neutralized by heating the mixture at about 65° C. and finally the temperature of the mixture is raised to about 100° C. for a few minutes in order to saponify any sultone present. Generally, the temperature is then lowered in continuing the process of this invention. If an olefin sulfonic acid with little or no sultones is used as one of the reactants, of course, then this saponification step would not be required. On the other hand this step can be combined with the overbasing step if the overbasing is carried out at 100° C. or higher. This is actually a preferred embodiment of the present process. It, in effect, eliminates the separate saponification step described above.

The mixture containing the sulfonated olefin derivative in a hydrocarbon medium, the inorganic barium compound, water and alkanol is subjected to treatment with $CO_2$ or $SO_2$ gas; this is the overbasing step. The $CO_2$ or $SO_2$ is simply bubbled through the mixture at the aforesaid reaction temperature until the mixture becomes acidic. At this point the overbasing is considered complete. This point can be determined by any suitable means. A simple method is to withdraw a sample of the reaction mixture and determine its acidity with and acid/base indicator such as $\alpha$-naphtholbenzein. This treatment with $CO_2$ or $SO_2$ to the point of acidity effectively complexes the stoichiometric excess of the barium compound (converted to $BaCO_3$ or $BaSO_3$) with the sulfonated olefin derivative, thus, forming the overbased barium olefin sulfonate.

The process of this invention is ordinarily carried out at atmospheric pressures. However, it can also be carried out at pressures above atmospheric. The use of pressures above atmospheric can be used to advantage to minimize solvent loss while carrying out the reaction; higher pressures might also be desirable when the reflux temperature of the system at atmospheric pressure is below that required to saponify any sultone present and the saponification is to be carried out during the overbasing step.

The following examples illustrate the process of the present invention; all parts are by weight unless otherwise noted.

EXAMPLE 1

A suitably sized vessel fitted with a gas inlet tube, stirrer, water collector, thermometer and condenser was charged with 100 parts (about 0.3 mole) of a sodium $C_{16}$-$\alpha$-olefin sulfonate and 600 parts of benzene. A warm solution of 41.6 parts (0.2 mole) of barium chloride in about 100 parts of water added; the mixture was stirred at 60° C. for three hours and then brought to reflux to distill off the water (a stream of nitrogen was passed through the mixture to facilitate water removal). The mixture thickened while the water was being removed when about 88 parts of benzene and about 170 parts of xylene were added to thin the mixture. When about 87 grams of water had been removed by distillation, the mixture became substantially unstirrable. This gelled mass was cooled to about room temperature. A solution of 52.1 parts (0.34 mole) of barium oxide in 400 parts of methanol was added to the cooled mixture. The mass was heated to 35° C. and carbon dioxide was bubbled through with stirring until the mixture was acidic to $\alpha$-naphtholbenzein (about 25 minutes). The carbon dioxide addition was discontinued at this time and nitrogen was bubbled through while the methanol and water were distilled off, benzene was added during the distillation to replace that lost in the benzene/methanol azeotrope. The mixture was then cooled and filtered. The benzene was then distilled off at 50° C. under reduced pressure; 93.2 parts of a slightly hazy liquid product was obtained. The product was analyzed and shown to contain 15.6 percent barium, 2.11 percent sulfur. The Ba/S ratio was 1.73.

Similar results are obtained when a $C_{16}$-$\alpha$-olefin sulfonic acid is used rather than its sodium salt. This, of course, would also eliminate the step in Example 1 using barium chloride.

Toluene, aviation alkylate and hexane when used in place of the xylene and benzene in Example 1 will also yield comparable results. When ethanol is used instead of methanol in Example 1, comparable results are also obtained.

EXAMPLE 2

A suitable vessel fitted with a stirrer, thermometer, water collector, and condenser was charged with 48.7 parts (0.04 mole based on acid number of 56.1) of a sulfonated $C_{18}+$ olefin derivative and 212.8 parts of xylene. While stirring this solution 3.1 parts (0.02 mole) of barium oxide and about three parts of water were added and the mixture was heated at 55°–65° C. for 60 minutes; then the temperature was raised to 95°–100° C. for a few minutes. This mixture was then cooled to about 70° C. and a solution of 27.6 parts (0.18 mole) of barium oxide and 150 parts of methanol was added. This mixture was refluxed for 30 minutes and then sulfur dioxide was bubbled in until the mixture became acidic to α-naphtholbenzein indicator (about 7 minutes). Sulfur dioxide addition was discontinued and nitrogen was bubbled through the mixture while methanol and water were distilled off. The mixture was cooled and was then diluted with about 180 parts of benzene and allowed to stand. The mixture was filtered and part of the xylene and benzene was removed under vacuum; 119.8 parts of a slightly hazy fluid product was obtained. Elemental analysis of the product showed it to contain 21.1 percent berium and 6.8 percent sulfur.

EXAMPLE 3

The process of Example 2 was repeated except that 58.3 parts (0.38 mole) of barium oxide in 300 parts of methanol was used; and the sulfur dioxide was bubbled into the mixture for 45 minutes. 156.7 parts of a slightly hazy, slightly viscous product were obtained. Analysis of this product showed it to contain 31.2 percent barium and 8.5 percent sulfur.

Similar reults are obtained when only one part of water is used instead of three parts of water. Similar results are obtained when ethanol, amyl alcohol or isopropanol are used instead of methanol.

EXAMPLE 4

In a suitably sized vessel fitted with a stirrer, thermometer, water collector and condenser was charged with 48.7 parts (0.04 mole based on an acid number of 46.1) of a sulfonated $C_{18}+$ olefin derivative and about 220 parts of xylene. This solution was stirred and 3.1 parts (0.02 mole) of barium oxide and about 3 parts of water were added; this mixture was heated at 55°–65° C. for 60 minutes and then the temperature was raised to about 99° C. for a few minutes. The solution was cooled to 70° C. and the solution of 73.6 parts (0.48 mole) of barium oxide in 350 parts of methanol was added; this mixture was then refluxed for 30 minutes. Sulfur dioxide was then passed into the mixture until the mixture was acidic to α-naphtholbenzein indicator (94 minutes). Addition of the sulfur dioxide was discontinued at this time. Methanol and water were distilled from the mixture and about 300 parts of benzene were added. This mixture was then filtered and benzene was removed from the filtrate under vacuum. The product became very viscous; about 5 ml. of dimethylformamide were added to reduce the viscosity. This diluted mixture was then filtered again; 237.55 parts of a viscous liquid product was obtained. Analysis of this product showed it to contain 20.9 percent barium and 5.7 percent sulfur.

Similar results are obtained when the reaction is carried out under pressure at a temperature of 150° C.

EXAMPLE 5

A vessel fitted with a stirrer, thermometer, water collector, and condenser was charged with 42.8 parts (0.1 mole based on a saponification number of 131) of a sulfonated $C_{18}+$ olefin derivative and about 220 parts of xylene. The solution was stirred and 7.8 parts (0.05 mole) of barium oxide and about 3 parts of water were added; this mixture was heated at 50–65° C. for 60 minutes and then briefly at 95–100° C. The solution was cooled to 70° C. and a solution of 38.3 parts (0.25 mole) of barium oxide in 300 parts of methanol was added. After refluxing this mixture for 30 minutes, sulfur dioxide was passed through the mixture under reflux until it was acidic to α-naphtholbenzein indicator (50 minutes). The sulfur dioxide addition was discontinued at this time and the methanol was distilled off. The methanol and water were distilled off. (The mixture became very viscous during the initial methanol distillation and consequently the temperature of the mixture was raised to 142° C. to insure removal of substantially all of the water.) The mixture was then cooled and about 350 parts of benzene were added to the resultant product. This benzene solution was then filtered and a portion of the benzene and xylene were distilled off; 138 parts of a very dark liquid product were obtained. Analysis of the product showed it to contain 28.0 percent barium and 7.6 percent sulfur.

The sulfonated $C_{18}+$ olefin derivatives used in Examples 2, 3, 4, and 5 were obtained by sulfonating a $C_{18}+$ olefin stream with sulfur trioxide using a conventional procedure in a falling film reactor. The exact composition of the Example 5 $C_{18}+$ olefin which was sulfonated is as follows:

| Olefin chain length | Percent by weight |
|---|---|
| $C_{14}$ | 0.03 |
| $C_{16}$ | 0.17 |
| $C_{18}$ | 9.50 |
| $C_{20}$ | 47.69 |
| $C_{22}$ | 26.83 |
| $C_{24}$ | 11.19 |
| $C_{26}$ | 3.54 |
| $C_{28}$ | 0.87 |
| $C_{30}$ | 0.19 |

| Olefin configuration | Percent distribution |
|---|---|
| Vinyl | 54 |
| Internal | 12 |
| Vinylidene | 34 |

EXAMPLE 6

A vessel fitted with a stirrer, thermometer, water collector, and condenser is charged with 42.8 parts (0.1 mole based on saponification number) of a sulfonated $C_{18}+$ olefin derivative, about 220 parts of xylene and 4.3 parts of water. A solution of 45.9 parts (0.3 mole) of barium oxide and 300 parts of methanol is added to the vessel and the mixture is refluxed for 60 minutes. Sulfur dioxide is bubbled into the mixture until it becomes acidic to α-naphtholbenzein indicator. The sulfur dioxide flow is discontinued and the methanol and water are distilled off. Any xylene which has come over during this distillation is replaced. The reaction mass is then filtered and a substantial yield of an over-based barium sulfonate complex product is obtained.

Similar results are obtained when an equivalent amount of barium hydroxide monohydrate is used in place of the barium oxide in Example 6. The use of toluene, heptane, n-butyl benzene, n-propyl benzene, ethyl benzene, catalytic reformate mixtures containing 50 percent aromatic hydrocarbons, aviation alkylate mixtures or other similar petroleum refinery streams for the xylene also yields comparable results. Substituting a light refinery oil such as No. 9 oil for a part of the xylene in the above example results in similar product yields. Carbon dioxide used in place of sulfur dioxide will produce similar results. An essentially similar reaction is carried out with $C_4$–$C_{30}$ alkenyl sulfonic acids containing little or no inner ester sultone and wherein the alkenyl portion of the molecule is derived from a $C_{18}+$ olefin stream as herein defined.

The examples clearly show that products are obtained which contain more than the stoichiometric amount of barium required to neutralize the sulfonic acids provided by the sulfonated olefin derivative. A comparison of the processes of Example 2 with Example 1 shows that sulfur dioxide is a more efficient acidic gas in the process than $CO_2$. In Example 2, using $SO_2$ as the reactant it took only 7 minutes to complete the overbasing reaction as determined by the mixture becoming acidic to the indicator. In Example 1, carbon dioxide had to be bubbled through the mixture for about 25 minutes before the reaction was complete as indicated by acidic reaction to the indicator. From a practical standpoint then the process utilizing the sulfur dioxide for the overbasing step is preferred.

The products obtained by the process of the present invention as illustrated in the above examples are especially useful as smoke suppressors in distillate hydrocarbon fuels used in diesel engines, and can be added to any commercial diesel fuel. In general these fuels are characterized as having a boiling range of 350° F. to 700° F. So-called residual oils having higher boiling points than this are sometimes blended with a lower boiling diesel fuel. Suitable diesel fuel oils are Federal Specification VV-F800 Grades DF-A, DF-1, DF-2 and DF-4, as well as ASTM Classes 1, 2, 3, and 4. Marine diesel fuel oils are also useful. A tabulation and discussion of suitable diesel fuel oils is presented in "Fuels and Lubricants," Milosh Popovich and Carl Hering, pages 134; 146–151, John Wiley and Sons, Inc., New York (1959).

Following are examples of diesel fuel compositions of this invention.

EXAMPLE 7

A diesel fuel composition is prepared by adding 0.05 percent by weight of the product of Example 6 to a Class 1 diesel fuel oil.

EXAMPLE 8

A diesel fuel composition is prepared by adding 3 percent by weight of the product of Example 1 to Grade DF-3 diesel fuel oil.

EXAMPLE 9

A diesel fuel composition is prepared by adding 1.5 percent of the product of Example 3 to a Class 2 diesel fuel oil.

EXAMPLE 10

A diesel fuel composition is prepared by adding 0.3 percent by weight of the product of Example 5 to Grade DF-2 diesel fuel oil.

EXAMPLE 11

A diesel fuel composition is prepared by adding 0.6 percent by weight of the product of Example 4 to a marine grade diesel fuel oil.

The amount of barium-containing overbased product prepared by the process of the present invention used in the fuel must be sufficient to reduce the fuels smoking tendency in engine operation. The concentration may range from 0.05 to about 3 percent by weight.

The smoke reducing characteristics of the products of the present process were determined in a diesel engine test using the Hartridge smoke meter for the smoke measurements. The procedure used involved running the engine at three loads, 141 brake horsepower (BHP—rated power) 146.4 BHP and 151.5 BHP, (dynamometer scale reading of 58.7, 61.0 and 63.0, respectively); and determining the smoke number at each load using the Hartridge smoke meter. The smoke number of the base fuel containing no smoke reducing additives was measured first and set arbitrarily as 100 percent relative smoke. The smoke numbers of the fuels containing the products of the present process as well as a commercial smoke reducer were then determined. The Hartridge smoke number for the fuels containing the smoke reducing additives was then compared with the control base fuel smoke number. The relationship of the smoke values was then expressed in terms of percent relative smoke as compared to the untreated fuel.

The results obtained in these evaluations are tabulated below; the base fuel was a No. 2 distillate fuel oil.

TABLE 1.—EFFECT OF ADDITIVES ON SMOKE TENDENCY OF DIESEL FUEL

| Test number | Additive | Concentration, g./Ba/gal. | Smoke number [1] | Relative smoke, percent |
|---|---|---|---|---|
| 1 | None | | 43 | 100 |
| 2 | Additive L [2] | 2.2 | 23 | 45.7 |
| 3 | Product of Example 3 | 2.1 | 22 | 43.7 |

[1] Hartridge smoke meter value, average of three results at each of the aforesaid three engine loads.
[2] A commercial barium containing smoke reducing diesel fuel additive.

The data shows that the Example 3 product is as effective a smoke reducer in diesel fuel as a commercial barium containing additive designed for smoke reduction in diesel engines. This data is representative of the smoke reducing effectiveness of the barium containing products produced by the process herein described.

The products of the present invention also were shown to have water emulsification properties suitable for use in commerical diesel fuels. Data also indicates that a product prepared using sulfur dioxide as the acidic gas would have reduced emulsification tendencies compared to a comparable product prepared using carbon dioxide.

The present invention therefore is encompassed in three embodiments, (a) a process for preparing barium sulfonate overbased products,
(b) the product prepared by this process, and
(c) diesel fuel containing a smoke reducing quantity of this product.

All three embodiments have been described in the foregoing disclosure; it is desired to limit this invention only within the spirit and scope of the following claims.

I claim:

1. A process for preparing an overbased barium olefin derived sulfonate which comprises
   (1) preparing a mixture of a sulfonated olefin derivative wherein said derivative is obtained by sulfonating a mixture of acylic monoolefins having from about 14 to about 30 carbon atoms, and an inert hydrocarbon medium,
   (2) adding thereto a mixture of from about 2 to about 10 times the stoichiometric amount based on said derivative, of an inorganic barium compound selected from barium oxide, barium hydroxide and barium hydroxide monohydrate, and from about 500 to about 1500 parts by weight of a $C_1$–$C_5$ alkanol, per mole of said barium compound and from about 2 to about 10% by weight of water based on the weight of said sulfonated olefin derivative, heating the resultant mixture to a temperature of from about 35° C. to about 150° C.,
   (3) introducing into said heated mixture sulfur dioxide gas until said mixture becomes acidic, and
   (4) distilling the alkanol and water from said mixture.

2. The process of claim 1 wherein said mixture of olefins comprises, by weight, 0–3 percent $C_{16}$ and lower olefins, 0.5–20 percent $C_{18}$ olefins, 33–50 percent $C_{20}$ olefins, 19–37 percent $C_{22}$ olefins, 6–15 percent $C_{24}$ olefins, 2–8 percent $C_{26}$ olefins and 0.3–10 percent $C_{28}$ and higher olefins and wherein the distribution of olefin configurations in said mixture is about 10–31 percent internal, 32–55 percent vinyl, and 30–50 percent vinylidene.

3. The process of claim 1 wherein said inorganic barium compound is barium oxide, and said alkanol has from 1 to 5 carbon atoms.

4. The process of claim 3 wherein said hydrocarbon medium is selected from xylene, hexane, benzene, toluene, light petroleum oils, aviation alkylate and mixtures thereof.

5. The process of claim 4 wherein said alkanol is methanol.

6. A product prepared by the process of claim 1.

7. A diesel fuel containing a smoke reducing quantity of the product prepared by the process of claim 1.

8. Diesel fuel containing a smoke reducing quantity of the product prepared by the process of claim 5.

9. The process of claim 1 wherein said alkanol is methanol.

References Cited

UNITED STATES PATENTS

| | | | |
|---|---|---|---|
| 2,695,910 | 11/1954 | Asseff et al. | 252—33 X |
| 2,956,018 | 10/1960 | Carlyle et al. | 252—18 |
| 3,021,280 | 2/1962 | Carlyle | 252—33 |
| 3,282,835 | 11/1966 | Asseff | 252—33 X |
| 3,312,618 | 4/1967 | Le Suer et al. | 252—33 |
| 3,437,465 | 4/1969 | Le Suer | 44—51 |
| 3,027,325 | 3/1962 | McMillan et al. | 252—33 |

FOREIGN PATENTS

| | | | |
|---|---|---|---|
| 661,907 | 2/1965 | Belgium | 44—76 |

DANIEL E. WYMAN, Primary Examiner

W. J. SHINE, Assistant Examiner

U.S. Cl. X.R.

44—76; 252—33